(12) United States Patent
Vanstone (10) Patent No.: US 9,640,012 B2
(45) Date of Patent: May 2, 2017

(54) TRANSACTION VERIFICATION PROTOCOL FOR SMART CARDS

(75) Inventor: Scott A. Vanstone, Campbellville (CA)

(73) Assignee: Certicom Corp., Mississauga, Ontario (CA)

( * ) Notice: Subject to any disclaimer, the term of this patent is extended or adjusted under 35 U.S.C. 154(b) by 857 days.

(21) Appl. No.: 11/959,098

(22) Filed: Dec. 18, 2007

(65) Prior Publication Data
US 2008/0183607 A1   Jul. 31, 2008

Related U.S. Application Data

(63) Continuation of application No. 09/360,575, filed on Jul. 26, 1999, now Pat. No. 7,328,338, which is a (Continued)

(30) Foreign Application Priority Data

Jan. 31, 1996   (GB) .................................. 9601924.5

(51) Int. Cl.
*H04L 9/32*      (2006.01)
*G07F 7/10*      (2006.01)
(Continued)

(52) U.S. Cl.
CPC ......... *G07F 7/1008* (2013.01); *G06Q 20/341* (2013.01); *G06Q 20/367* (2013.01); *G06Q 20/40975* (2013.01); *G06Q 40/00* (2013.01)

(58) Field of Classification Search
CPC ... H04L 9/3247; H04L 63/061; H04L 9/3265; H04L 9/0643; H04L 9/3249; H04L 9/3271; G11B 20/0021
(Continued)

(56) References Cited

U.S. PATENT DOCUMENTS 4,326,098 A * 4/1982 Bouricius et al. ............ 713/155
4,405,829 A * 9/1983 Rivest et al. .................. 380/30
(Continued)

FOREIGN PATENT DOCUMENTS

EP   0588339 A2    3/1994
GB   2283349 A  *  5/1995   ........... G06Q 20/341

OTHER PUBLICATIONS

Dictionary of Computers, Information Processing, and Telecommunications; 2nd Ed. ; Jerry M. Rosenberg, Ph.D, 1987; John Wiley & Sons.*

(Continued)

*Primary Examiner* — Mohammad Z Shaikh
*Assistant Examiner* — Mary Gregg
(74) *Attorney, Agent, or Firm* — Jose Gutman; Fleit Gibbons Gutman Bongini & Bianco P.L.

(57) ABSTRACT

A protocol appropriate for smartcard purchase applications such as those that might be completed between a terminal or ATM and a users personal card is disclosed The protocol provides a signature scheme which allows the card to authenticate the terminal without unnecessary signature verification which is an computationally intense operation for the smart card. The only signature verification required is that of the terminal identification (as signed by the certifying authority, or CA, which is essential to any such protocol). In the preferred embodiment, the protocol provides the card and terminal from fraudulent attacks from impostor devices, either a card or terminal.

56 Claims, 2 Drawing Sheets

| Smartcard Action | Transmission | Terminal Action |
|---|---|---|
| | | Generate unique purchase ID and create transaction message |
| | Purchase ID, TA 220 bits [TIU ID, $Y_T$] CA 355 bits | |
| Verify Certificate signed by CA 15,500 clock cycles Generate Random Number (R2) and sign transaction number using terminal's public key 15,500 clock cycles | | |
| Send signed transaction data, hash and certificate signed by CA | [r1,s1] card 375 bits Hash 128 bits [Smartcard ID, Smartcard Public Key] CA 355 bits | |
| | | Verify Certificate signed by CA Given the hash h and s1, deduce $\alpha^{xT}$ session key Recover message from r1 |
| | R2 100 bits | Send R2 contained in message to card to prove identity and to acknowledge the provision of service |
| Check R2 to complete transaction | | |
| Total computation time = 31,000 clock cycles | Total bits transmitted = 1533 | |

Related U.S. Application Data continuation of application No. 08/790,545, filed on Jan. 30, 1997, now Pat. No. 5,955,717.

(51) Int. Cl.
    *G06Q 20/34* (2012.01)
    *G06Q 20/36* (2012.01)
    *G06Q 20/40* (2012.01)
    *G06Q 40/00* (2012.01)

(58) Field of Classification Search
    USPC .......................................................... 713/169
    See application file for complete search history.

(56) References Cited

U.S. PATENT DOCUMENTS

| | | | | |
|---|---|---|---|---|
| 4,720,859 | A | * | 1/1988 | Aaro et al. ..................... 713/169 |
| 5,224,164 | A | * | 6/1993 | Elsner ............................. 380/44 |
| 5,276,736 | A | | 1/1994 | Chaum |
| 5,295,188 | A | | 3/1994 | Wilson et al. |
| 5,396,558 | A | | 3/1995 | Ishiguro et al. |
| 5,420,926 | A | * | 5/1995 | Low et al. ....................... 705/74 |
| 5,455,407 | A | * | 10/1995 | Rosen .............................. 705/69 |
| 5,461,217 | A | * | 10/1995 | Claus .............................. 235/380 |
| 5,475,756 | A | * | 12/1995 | Merritt ............................ 705/73 |
| 5,485,519 | A | | 1/1996 | Weiss |
| 5,502,765 | A | * | 3/1996 | Ishiguro et al. ................ 705/67 |
| 5,544,086 | A | * | 8/1996 | Davis et al. .................... 705/68 |
| 5,590,196 | A | * | 12/1996 | Moreau .......................... 705/78 |
| 5,608,801 | A | * | 3/1997 | Aiello et al. ................... 380/46 |
| 5,637,846 | A | | 6/1997 | Boers et al. |
| 5,657,389 | A | * | 8/1997 | Houvener .................... 713/186 |
| 5,671,279 | A | * | 9/1997 | Elgamal ......................... 705/79 |
| 5,678,010 | A | * | 10/1997 | Pittenger et al. .............. 705/44 |
| 5,699,528 | A | * | 12/1997 | Hogan ............................ 705/40 |
| 5,715,314 | A | * | 2/1998 | Payne et al. ................... 705/78 |
| 5,721,781 | A | * | 2/1998 | Deo et al. ...................... 705/67 |
| 5,757,917 | A | * | 5/1998 | Rose et al. ..................... 705/79 |
| 5,955,717 | A | | 9/1999 | Vanstone |
| 6,049,785 | A | | 4/2000 | Gifford |
| 6,069,952 | A | | 5/2000 | Saito et al. |

OTHER PUBLICATIONS

NSA provides value-added crypto security by Communications News (May 1995); 2 pages.*

Definition of Smart Card, http://en.wikipedia.org/wiki/Smart-card accessed on Aug. 31, 2006.

* cited by examiner

Figure 1

| Smartcard Action | Transmission | Terminal Action |
|---|---|---|
|  |  | Generate unique purchase ID and create transaction message |
|  | ← Purchase ID, TA 220 bits [TIU ID, $Y_T$] CA 355 bits |  |
| Verify Certificate signed by CA 15,500 clock cycles Generate Random Number (R2) and sign transaction number using terminal's public key 15,500 clock cycles |  |  |
| Send signed transaction data, hash and certificate signed by CA | → [r1,s1] card 375 bits Hash 128 bits [Smartcard ID, Smartcard Public Key] CA 355 bits |  |
|  | ← | Verify Certificate signed by CA Given the hash h and s1, deduce $\alpha^{kT}$ session key Recover message from r1 |
|  | R2 100 bits | Send R2 contained in message to card to prove identity and to acknowledge the provision of service |
| Check R2 to complete transaction |  |  |
| Total computation time = 31,000 clock cycles | Total bits transmitted = 1533 |  |

TRANSACTION VERIFICATION PROTOCOL FOR SMART CARDS

CROSS-REFERENCE TO RELATED APPLICATIONS

The present application is a continuation of U.S. patent application Ser. No. 09/360,575 flied on Jul. 26, 1999 now U.S. Pat. No. 7,328,338 which is a continuation of U.S. patent application Ser. No. 08/790,545 filed on Jan. 30, 1997 and issued as U.S. Pat. No. 5,955,717, and claims priority from United Kingdom Patent Application No. 9601924.5 filed on Jan. 31, 1996, the contents of which are hereby incorporated by reference.

FIELD OF THE INVENTION

The present invention relates to methods and apparatus for verifying the authenticity of partners in an electronic transaction.

BACKGROUND OF THE INVENTION

It has become widely accepted to conduct transactions such that as financial transactions or exchange of documents electronically. In order to verify the transaction, it is also well-known to "sign" the transaction digitally so that the authenticity of the transaction can be verified. The signature is performed according to a protocol that utilizes the message, i.e., the transaction, and a secret key associated with the party. Any attempt to tamper with the message or to use a key other than that of the signing party will result in an incompatibility between the message and the signature or will fail to identify the party correctly and thereby lead to rejection of the transaction.

The signature must be performed such that the parties' secret key cannot be determined. To avoid the complexity of distributing secret keys, it is convenient to utilize a public key encryption scheme in the generation of the signature. Such capabilities are available where the transaction is conducted between parties having access to relatively large computing resources but it is equally important to facilitate such transactions at an individual level where more limited computing resources are available.

Automated teller machines (ATMs) and credit cards are widely used for personal transactions and as their use expands, so the need to verify such transactions increases. Transaction cards are now available with limited computing capacity, so-called "Smart Cards," but these are not sufficient to implement existing digital signature protocols in a commercially viable manner. As noted above, in order to generate a digital signature, it is necessary to utilize a public key encryption scheme. Most public key schemes are based on the Diffie Helman Public key protocol and a particularly popular implementation is that known as DSS. The DSS scheme utilizes the set of integers Zp where p is a large prime. For adequate security, p must be in the order of 512 bits although the resultant signature may be reduced mod q, where q divides p−1, and may be in the order of 160 bits.

The DSS protocol provides a signature composed of two components r, s. The protocol requires the selection of a secret random integer k from the set of integers (0, 1, 2, . . . q−1), i.e.

$$k \in \{0, 1, 2, \ldots q-1\}.$$

The component r is then computed such that $$r = \{\beta^k \bmod p\} \bmod q$$

where $\beta$ is a generator of q.

The component s is computed as $$s = [k^{-1}(h(m)) + ar] \bmod q$$

where m is the message to be transmitted,
h(m) is a hash of the message, and
a is the private key of the user.

The signature associated with the message is then sr which may be used to verify the origin of the message from the public key of the user.

The value of $\beta^k$ is computationally difficult for the DSS implementation as the exponentiation requires multiple multiplications mod p. This is beyond the capabilities of a "Smart Card" in a commercially acceptable time. Although the computation could be completed on the associated ATM, this would require the disclosure of the session key k and therefore render the private key, a, vulnerable.

An alternative encryption scheme that provides enhanced security at relatively small modulus is that utilizing elliptic curves in the finite field $2^m$. A value of m in the order of 155 provides security comparable to a 512 bit modulus for RSA and therefore offers significant benefits in implementation. Diffie Hellman Public Key encryption utilizes the properties of discrete logs so that even if a generator $\beta$ and the exponentiation $\beta^k$ are known, the value of k cannot be determined.

A similar property exists with elliptic curves where the addition of two points on a curve produces a third point on the curve. Similarly, multiplying a point by an integer k produces a point on the curve.

However, knowing the point and the origin does not reveal the value of the integer 'n' which may then be used as a session key for encryption. The value kP, where P is an initial known point, is therefore equivalent to the exponentiation $\beta^k$.

Elliptic Curve Cryptosystems (ECC) offer advantages over other public key cryptosystems when bandwidth efficiency, reduced computation, and minimized code space are application goals.

SUMMARY OF THE INVENTION

The preferred embodiment of the present invention discloses a protocol optimized for an ECC implementation for use with a "smartcard" having limited computing capacity. The protocol has been found to provide superior performance relative to other smartcard protocols and is achievable with an ECC implementation.

The protocol disclosed is appropriate for smartcard purchase applications such as those that might be completed between a terminal or ATM and a user's personal card. The protocol provides a signature scheme which allows the card to authenticate the terminal without unnecessary signature verification which is a computationally intense operation for the smart card. The only signature verification required is that of the terminal identification (as signed by the certifying authority, or CA, which is essential to any such protocol. In the preferred embodiment, the protocol protects the card and terminal from fraudulent attacks from impostor devices, either a card or terminal.

A method of performing a transaction between a first and a second participant wherein the second participant permits a service to be provided to the first participant in exchange for a payment. The method comprising the steps of the first participant verifying the legitimacy of the second participant to obtain assurance that the service will be provided upon payment, the second participant verifying the legitimacy of the first participant to obtain assurance that payment will be secured upon provision of the service, and the second participant obtaining a digital signature for the first participant on the transaction whereby the second participant may obtain payment from a third participant.

BRIEF DESCRIPTION OF THE DRAWINGS

An embodiment of the invention will now be described by way of example only with reference to the accompanying drawings, in which.

DESCRIPTION OF THE PREFERRED EMBODIMENTS

Figure 1:
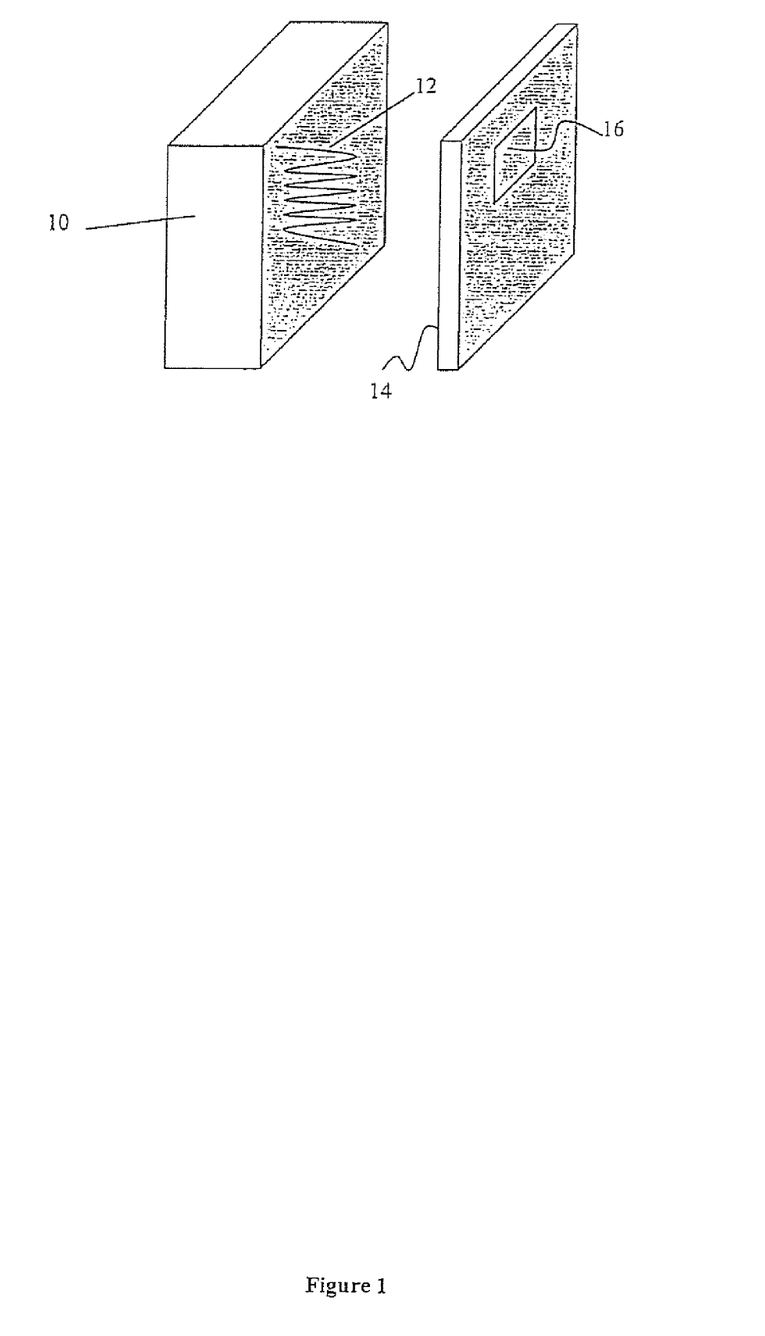
FIG. 1 is a diagrammatic representation of a scanning terminal and personal transaction card.

Referring therefore to FIG. 1, a scanner terminal 10 has an inductive coupling 12 to cooperate with a card 14. When a card 14 is passed through the inductive coupling 12 a transaction is recorded within a memory 16 on the card 14. Typically the transaction will debit the card with a set amount, e.g., an admission price, and the terminal 10 is credited a corresponding amount. The terminal is connected through a network to a central computer located at a financial institution that maintains records of transactions in a conventional manner.

Figure 2:
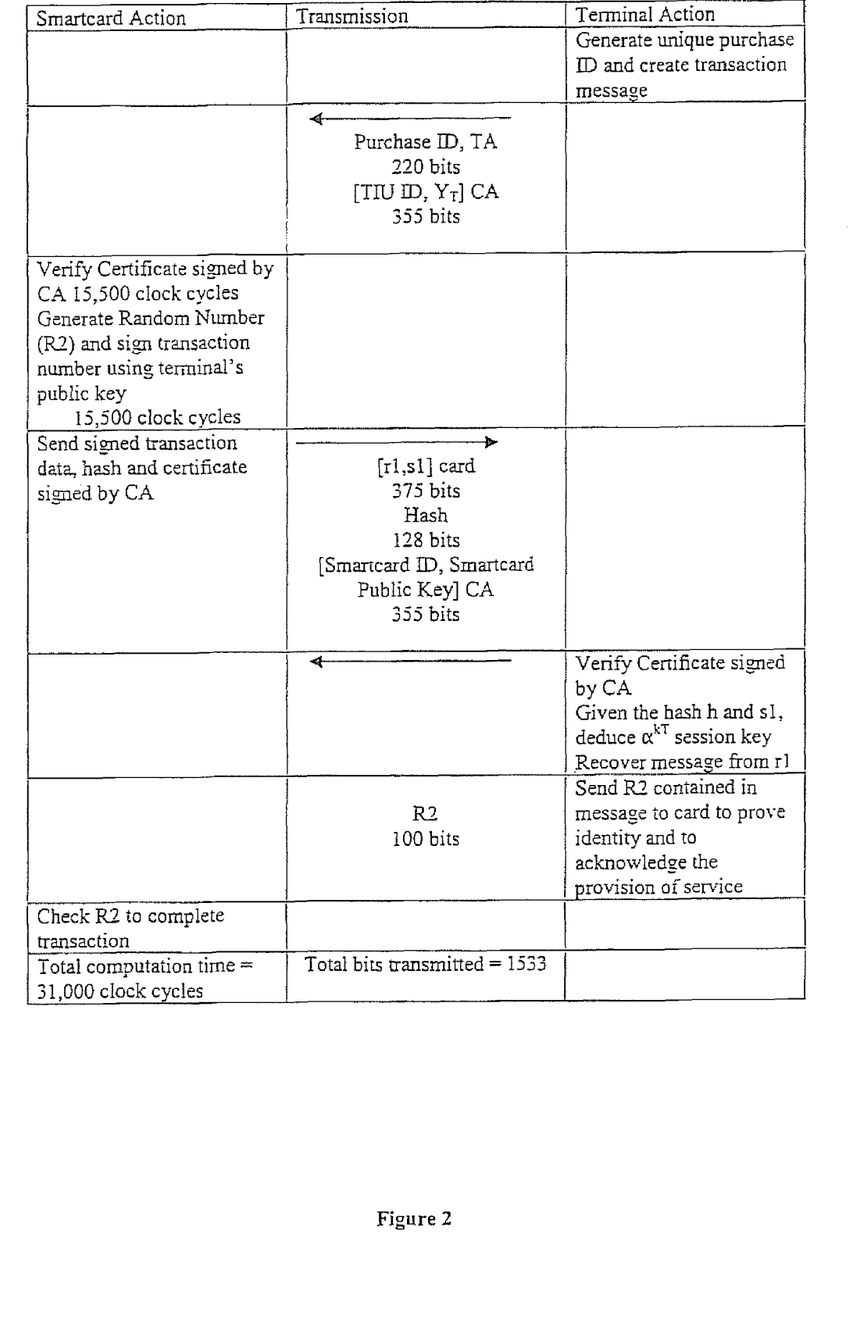
FIG. 2 is a chart that schematically illustrates the protocol.

To avoid fraudulent transactions being recorded at either the card or terminal the protocol shown in FIG. 2 is utilized.

Upon the scanner sensing the card through coupling 12, a unique purchase I.D. (PID) is generated by the terminal 10. The terminal 10 has a private key, t, stored in a secure location and a corresponding public key $Y^t$ equal to $\alpha^t$. The terminal 10 generates a message, M1, consisting of the purchase I.D. PID and the transaction amount, TA. It also appends to the message M1 a certificate signed by the certifying authority CA that includes terminal identification information TIU ID and the public key $Y^t$. The message M1 is received by the card 14.

Card 14 has a private key a stored securely in memory 16 and a public key $Y_c$ equal to $\alpha^a$ ($\alpha$ is the generator point for the curve). The card verifies the terminals certificate as signed by the certifying authority CA according to a normal elliptic curve scheme. Having verified the certificate, the card generates a pair of random numbers R2 and R3 and signs the unique purchase I.D. PID using the terminals public key according to an established protocol.

To effect signing, the card generates a random integer k and computes a session parameter $\alpha^k$. It also computes $Y_t^k$ and generates signature components r1 and s1.

The component r1 is provided by $M2 Y_t^k$, mod L where:
M2 is the message TA//TIU ID//R2/PID, and
$L=2^l-1$ and l is an integer greater than or equal to the number of bits in M2. (//signifies concatenation).

The component s1 is provided by h=a+k mod q where:
q is the order of the curve and
h is a hash $h(M2//\alpha^k//R3)$.

The card now sends signature components r1, s1 the hash h and a certificate issued by the certifying authority CA containing its ID and public key to the terminal 10.

The terminal verifies the cards credentials as signed by the CA. Given the hash h and s1 it can calculate the value $\alpha^{kt}$ and thereby recover the message M2 from r1 using the cards public key. As the message M2 includes the PID, the terminal is able to verify the authenticity of the card 10.

The recovered message includes R2 which is then returned to the card 10 to prove that the terminal is extracting R2 in real time, i.e., during the transit of the card through the coupling 12, using its private key. This also prevents a reply attack by the terminal 10.

The receipt of R2 also serves to acknowledge provision of the service. Upon receipt, the card checks R2 to ensure the message was recovered using the terminals private key. This confirms that the card was talking to the terminal rather than a fraudulent device which would not have the private key, t, available.

If the card confirms the receipt of R2, it transmits the random R3 to the terminal 10 to complete the transaction. R3 is required for card signature verification by the bank and so R3 is retained by the terminal 10 for central processing purposes. R3 is not released by the card until it has received R2 which confirms that the terminal 10 is performing computations in real time.

The terminal 10 is required to submit to the financial institution the stored values of R2, R3, TA, PID, TIU ID, s1 and $\alpha^k$ in addition to the credentials of both card and terminal 10. With this information the bank card is able to reproduce hash h, i.e. $h(M2//\alpha^k//R3)$ by using the cards public key $Y_c$ to prove that the transaction was authentic.

It will be noted that the last two passes are essentially trivial and do not require computation. Accordingly the computation required by the card is minimal, being restricted to one verification and one signature that involves two exponentiations, with the balance avoiding computationally intense operations.

As indicated in FIG. 2, an ECC implementation is the field $2^{155}$ using an anomalous curve of this protocol would result in less bandwidth (1533 bits) and reduced computation for the smartcard (31,000 clock cycles). The computational savings over previous protocols are possible due to features of the elliptic curve signature scheme used by the smartcard.

The particular benefits and attributes may be summarized as:

1. The purchase identifier PID is unique and is required to prevent terminal replay to the bank. If the purchase identifier is not unique, a random number R1 will also be required to provide the equivalent of the PID.
2. The random bit string R2 is required to prevent replay to the card.
3. A hash function (h) such as the SHA1 is required to prevent modification of the message (m) and the terminal's identification (TIU ID).
4. There appears to be no advantage to having the transaction amount signed by the terminal, resulting in one less signature verification for the card. The reason for this is that the message signed by the card contains a random number R2 which can only be recovered by the terminal.
5. Using this scheme, the message m may only be recovered by the terminal (note the terminal's public key is used in step III therefore requiring the terminal's private key to verify and recover contents). By demonstrating to the card that the random string (R2) was obtained from the message, the terminal can be authenticated to the card.

The embodiments of the invention in which an exclusive property or privilege is claimed are defined as follows:

1. A method of performing, in a communication system, a first transaction between a first participant device comprising a first processing unit performing cryptographic operations and a second participant device performing cryptographic operations wherein said second participant device permits a service to be provided to said first participant device to complete said first transaction and is enabled to obtain payment from a third participant in a second transaction, said method performed by said first processing unit and comprising:

verifying a digitally signed message from said second participant device, said digitally signed message comprising an identifier of said second participant device;

generating a digital signature using an anomalous elliptic curve scheme involving two exponentiations by performing:

generating a first value comprising a first random bit string and a second value comprising a second random bit string wherein said second value is required by said third participant to complete said second transaction; and generating said digital signature comprising a first signature component encrypting said first value with said identifier of said second participant device and a second signature component generated using a hash, said hash being generated using said second value;

providing said first signature component and second signature component and said hash to said second participant device, for decryption of said first signature component using said second signature component and said hash, and for extraction of said first value from said first signature component;

receiving said extracted first value from said second participant device and verifying that said extracted first value received from said second participant device is equal to said first value originally generated by said first processing unit; and authenticating said second participant device by determining that said extracted first value received from said second participant device is equal to said first value originally generated by said first processing unit, said first processing unit completing said first transaction by providing said second value to said authenticated second participant device and thereby obtaining said service, whereupon said authenticated second participant device completes said second transaction by providing said second value, received from said first processing unit, to said third participant.

2. The method according to claim 1, wherein any one or more of the following is true: said first participant device is a card which performs cryptographic operations; said second participant device is a terminal; said third participant is a financial institution.

3. The method according to claim 1, wherein said first processing unit provides information pertaining to said first participant device with said digital signature.

4. The method according to claim 1 wherein said second participant device comprises a second processing unit.

5. A device for performing, in a communication system, a first transaction between a first participant and a second participant, wherein said second participant permits a service to be provided to said first participant to complete said first transaction and is enabled to obtain payment from a third participant in a second transaction, said device being located at said first participant, said device being configured for communicating with said second participant, and said device comprising a processing unit configured for:

verifying a digitally signed message from said second participant, said digitally signed message comprising an identifier of said second participant;

generating a digital signature using an anomalous elliptic curve scheme involving two exponentiations by:

generating a first value comprising a first random bit string and a second value comprising a second random bit string, wherein said second value is required by said third participant to complete said second transaction; and generating said digital signature comprising a first signature component encrypting said first value and said identifier of said second participant and a second signature component generated using a hash, said hash being generated using said second value;

providing said first signature component and second signature component and said hash to said second participant, for decryption of said first signature component using said second signature component and said hash, and for extraction of said first value from said first signature component;

receiving said extracted first value from said second participant and verifying that said extracted first value received from said second participant is equal to said first value originally generated by said first participant device; and authenticating said second participant by determining that said extracted first value received from said second participant is equal to said first value originally generated by said processing unit, completing said first transaction by providing said second value to said authenticated second participant thereby obtaining said service from said second processing device, and said authenticated second participant completing said second transaction by providing said second value, received from the first participant to said third participant.

6. The device according to claim 5, wherein any one or more of the following is true: said device is a card which performs cryptographic operations; said second participant is a terminal; said third participant is a financial Institution.

7. The device according to claim 5, wherein said processing unit is further configured for providing information pertaining to said first participant with said digital signature.

8. A method of performing, in a communication system, a first transaction between a first participant device and a second participant device comprising a second processing unit, wherein said second participant device permits a service to be provided to said first participant device to complete said first transaction, and is enabled to obtain payment from a third participant in a second transaction, said method comprising:

said second processing unit obtaining a signature and a hash from said first participant device, said signature comprising a first signature component encrypting a first value and a second signature component generated using said hash, said hash being generated using a second value, said signature encrypted using an anomalous elliptic curve scheme;

said second processing unit extracting said first value from said first signature component using said second signature component and said hash;

said second participant device authenticating itself to said first participant device by sending said first value extracted from said first signature component to said first participant device;

after being authenticated by said first participant device upon said first participant device determining that said first value extracted from said first signature component and returned to said first participant device is equal to said first value originally encrypted in said first signature component, said second participant device receiving said second value from said first participant device, completing said first transaction, for providing to said third participant; and said second participant device permitting said service to be provided to said first participant device to complete said first transaction, and completing said second transaction by providing said second value to said third participant.

9. The method according to claim 8, wherein any one or more of the following is true; said first participant device is a card which performs cryptographic operations; said second participant device is a terminal; said third participant is a financial institution.

10. The method according to claim 8, wherein said second participant device obtains information pertaining to said first participant device with said signature.

11. A device for performing, in a communication system, a first transaction between a first participant and a second participant wherein said second participant permits a service to be provided to said first participant to complete said first transaction, and is enabled to obtain payment from a third participant in a second transaction, said device being located at said second participant, said device being configured for communicating with said first participant, and said device comprising a processing unit configured for:
obtaining a signature and a hash from said first participant, said signature encrypted using an anomalous elliptic curve scheme and comprising a first signature component encrypting a first value and a second signature component generated using said hash, said hash being generated using a second value;
extracting said first value from said first signature component using said second signature component and said hash;
sending said extracted first value extracted from said first signature component to said first participant to authenticate said device to said first participant; and
after said first participant determines that said extracted first value extracted from said first signature component and returned to said first participant is equal to said first value originally encrypted in said first signature component, receiving said second value from said first participant for providing to said third participant; and
permitting said service to be provided to said first participant, thus completing said first transaction, and providing said second value, to said third participant, thus completing said second transaction.

12. The device according to claim 11, wherein any one or more of the following is true: said first participant device is a card which performs cryptographic operations: said device is a terminal; said third participant is a financial institution.

13. The device according to claim 11, wherein said processing unit is further configured for obtaining information pertaining to said first participant with said signature.

14. The device according to claim 11 wherein said first value is generated by said first participant and encrypted in said first signature component to have said device extract said first value from said first signature component and return said first value to said first participant, said first participant also having generated said second value, said second value to be provided to said device upon verifying that said first value extracted from said first signature component has been returned by said device and is equal to said first value originally generated by said first participant.

15. A method of performing a first transaction in a communication system between a first participant device comprising a first processing unit and a second participant device comprising a second processing unit, wherein said second participant device permits a service to be provided to said first participant device to complete said first transaction, and is enabled to obtain payment from a third participant in a second transaction, said method comprising:
said first processing unit verifying a digitally signed message from said second participant device, said digitally signed message comprising an identifier of said second participant device;
said first processing unit generating a digital signature using an anomalous elliptic curve scheme involving two exponentiations by performing:
generating a first value comprising a first random bit string and a second value comprising a second random bit string wherein said second value is required by said third participant to complete said second transaction; and
said first processing unit generating said digital signature comprising a first signature component encrypting said first value and a second signature component generated using a hash, said hash generated using said second value;
said first participant device providing said first signature component and second signature component and said hash to said second participant device;
said second processing unit decrypting said first signature component and extracting said first value from said first signature component using said second signature component and said hash;
said second participant device authenticating itself to said first participant device by sending said extracted first value extracted from said first signature component to said first participant device;
said first processing unit receiving said extracted first value extracted from said first signature component and returned by said second participant device and verifying that said extracted first value extracted from said first signature component and returned by said second participant is equal to said first value originally generated by said first processing unit;
said first processing unit authenticating said second participant device by determining that said extracted first value extracted from said first signature component and returned by said second participant device is equal to said first value originally generated by said first processing unit, said first participant device completing said first transaction by providing said second value to said authenticated second participant device and thereby obtaining said service; and
said authenticated second participant device permitting said service to be provided to said first participant device and completing said second transaction by providing said second value to said third participant.

16. The method according to claim 15, wherein any one or more of the following is true: said first participant device is a card which performs cryptographic operations; said second participant device is a terminal; and said third participant is a financial institution.

17. The method according to claim 15, wherein said second processing unit obtains information pertaining to said first participant device with said digital signature.

18. A system for performing a first transaction between a first participant and a second participant, wherein said second participant permits a service to be provided to said first participant, to complete said first transaction, and is enabled to obtain payment from a third participant to complete a second transaction, said system comprising a first participant device comprising a first processing unit and a second participant device comprising a second processing unit configured to communicate with each other, said system being configured for:

said first processing unit verifying a digitally signed message from said second participant device, said digitally signed message comprising an identifier of said second participant device;

said first processing unit generating a digital signature using an anomalous elliptic curve scheme involving two exponentiations by performing:
generating a first value and a second value wherein said second value is required by said third participant to complete said second transaction; and
generating said digital signature comprising a first signature component encrypting said first value and a second signature component generated using a hash, said hash generated using said second value;

said first participant device providing said first signature component and second signature component and said hash to said second participant device;

said second processing unit decrypting said first signature component and extracting said first value from said first signature component using said second signature component and said hash;

said second participant device sending said first value extracted from said first signature component to said first participant device;

said first processing unit receiving said first value extracted from said first signature component and returned by said second participant device and verifying that said first value extracted from said first signature component and returned by said second participant is equal to said first value originally generated by said first processing unit;

said first processing unit authenticating said second participant by determining that said first value extracted from said first signature component and returned by said second participant is equal to said first value originally generated by said first processing unit, said first participant device completing said first transaction by providing said second value to said authenticated second participant device and thereby obtaining said service; and said second participant device permitting said service to be provided to said first participant device and completing said second transaction by providing said second value, received from said first processing unit, to said third participant.

19. The system according to claim 18, wherein any one or more of the following, is true: said first participant device is a card which performs cryptographic operations: said second participant device is a terminal; said third participant is a financial institution.

20. The system according to claim 18, wherein said second processing unit obtains information pertaining to said first participant device with said digital signature.

21. A method of performing, in a communication system, a first transaction between a first participant device comprising a first processing unit and a second participant device, wherein said second participant device permits a service to be provided to said first participant device to complete said first transaction, and is enabled to obtain payment from a third participant in a second transaction, said method comprising:

upon initiation of said transaction by said first participant device, said first participant device receiving from said second participant device, a first message including information pertaining to said second participant device;

said first processing unit verifying said information pertaining to said second participant device;

said first processing unit generating a digital signature using an anomalous elliptic curve scheme involving two exponentiations by performing:
generating a first value and a second value;
preparing a second message comprising said first value; and
preparing a digital signature comprising a first signature component encrypting said second message and a second signature component generated using a hash, said hash generated using said second value;

said first participant device sending said first signature component and second signature component, said hash and information pertaining to said first participant device to said second participant device, whereupon said second participant device decrypts said first signature component using said second signature component and said hash and extracts said first value from said first signature component;

said first processing unit receiving said extracted first value from said second participant device to acknowledge provision of said service; and said first processing unit authenticating said second participant device by verifying said extracted first value received from said second participant device is equal to said first value originally generated by said first processing unit, and completing said first transaction by sending said second value to said authenticated second participant device thereby obtaining said service and completing said second transaction by providing to said second value to said third participant.

22. The method according to claim 21 wherein any one or more of the following is true: said first participant device is a card which performs cryptographic operations; said second participant device is a terminal; said third participant is a financial institution.

23. The method according to claim 21 wherein said information pertaining to said second participant device included in said first message includes details and credentials of said second participant device.

24. The method according to claim 23 wherein said credentials include a public key certificate.

25. The method according to claim 21 wherein said information pertaining to said first participant device included in said second message includes details and credentials of said first participant device.

26. The method according to claim 21 wherein said second message includes an identifier generated by said second participant device to provide verification of the authenticity of said first participant device.

27. The method according to claim 26 wherein said identifier is a unique purchase I.D.

28. The method according to claim 21 wherein upon said first participant device sending said first signature component and second signature component, said hash and said information to said second participant device, said second participant device extracts said second message from said first signature component using said second signature component and said hash and extract said first value from said second message for returning said first value to said first participant device.

29. A system for performing a first transaction between a first and second participant wherein said second participant permits a service to be provided to said first participant to complete said first transaction, and is enabled to obtain payment from a third participant in a second transaction, said system comprising at least a first participant device, said first participant device having a cryptographic processor that is configured for;

upon initiation of said transaction, receiving from a second participant device, a first message including information comprising an identifier of said second participant device;

verifying said information pertaining to said second participant device by decrypting said first message;

generating a digital signature using an anomalous elliptic curve scheme involving two exponentiations by performing:

generating a first value comprising a random bit string and a second value comprising a random bit string;

preparing a second message comprising said first value;

preparing a digital signature comprising a first signature component encrypting said second message with said identifier of said second participant device and a second signature component generated using a hash, said hash generated using said second value;

sending said first signature component and second signature component, said hash and information pertaining to said first participant device to said second participant device, whereupon said second participant device decrypts said first signature component using said second signature component and said hash and extracts said first value from said first signature component;

receiving said extracted first value from said second participant device to acknowledge provision of said service; and authenticating said second participant device by verifying said extracted first value received from said second participant device is equal to said first value originally generated by said first processing unit, and completing said first transaction by sending said second value to said authenticated second participant device thereby obtaining said service, and thereby enabling said second participant device to complete said second transaction by providing said second value to said third participant.

30. The system according to claim 29 wherein any one or more of the following is true; said first participant device is a card which performs cryptographic operations; said second participant device is a terminal; said third participant is a financial institution.

31. The system according to claim 29 wherein said information pertaining to said second participant device included in said first message further includes details and credentials of said second participant.

32. The system according to claim 31 wherein said credentials include a public key certificate.

33. The system according to claim 29 wherein said information pertaining to said first participant device included in said second message includes details and credentials of said first participant.

34. The system according to claim 29 wherein said second message includes an identifier generated by said second participant device to provide verification of the authenticity of said first participant device.

35. The system according to claim 34 wherein said identifier is a unique purchase I.D.

36. The system according to claim 29 wherein said system further comprises a second participant device having a second cryptographic processor that is configured to, upon said first participant device sending said first signature component and second signature component, said hash and information pertaining to said first participant device to said second participant device, verify said information pertaining to said first participant device and extract said second message from said first signature component using said second signature component and said hash.

37. A method of performing, in a communication system, a first transaction between a first participant device and a second participant device comprising a second processing unit, wherein said second participant device permits a service to be provided to said first participant device to complete said first transaction, and is enabled to obtain payment from a third participant to complete a second transaction, said method comprising:

upon initiation of said transaction by said first participant device, said second participant device sending a first message to said first participant device, said first message including information pertaining to said second participant device;

said second participant device receiving from said first participant, a digital signature, a hash and information pertaining to said first participant device, said digital signature comprising a first signature component being prepared using a second message, said second message being prepared to comprise a first value, and a second signature component generated using said hash, said hash being generated using a second value;

said second processing unit verifying said information pertaining to said first participant device;

said second processing unit extracting said second message from said first signature component using said second signature component and said hash and extracting said first value from said second message;

said second participant device sending said first value extracted from said second message to said first participant device to acknowledge provision of said service and authenticate itself to the first participant device; and after being authenticated by said first participant device upon determining that said first value extracted from said second message and returned to said first participant device is equal to said first value originally generated by said first participant device, said authenticated second participant device receiving said second value from said first participant device, and completing said second transaction by providing said second value to said third participant to be used to obtain payment from said third participant.

38. The method according to claim 37 wherein said second participant device is a terminal and said first participant device is a card which performs cryptographic operations.

39. The method according to claim 38 wherein said participant is a financial institution.

40. The method according to claim 37 wherein said information pertaining to said second participant device included in said first message includes details and credentials of said second participant device.

41. The method according to claim 40 wherein said credentials include a public key certificate.

42. The method according to claim 37 wherein said information pertaining to said first participant device included in said second message includes details and credentials of said first participant device.

43. The method according to claim 37 wherein said second message includes an identifier generated by said second participant device to provide verification of the authenticity of said first participant device.

44. The method according to claim 43 further comprising:
said second participant device completing said transaction by providing said service; and
said second participant device sending said third participant said first value and second value and said identifier to obtain said payment.

45. The method according to claim 44 further comprising:
said second participant device obtaining said payment from said third participant.

46. The method according to claim 43 wherein said identifier is a unique purchase I.D.

47. The method according to claim 37 wherein said first participant device comprises a first processing unit, said first value and said second value being generated by said first processing unit, said second value to be provided to said second participant device upon said first participant device verifying that said first value has been returned by said second participant device and is equal to said first value originally generated by said first participant device.

48. A system for performing a first transaction in a communication system between a first and a second participant wherein said second participant permits a service to be provided to said first participant to complete said first transaction, and is enabled to obtain payment from a third participant in a second transaction, said system configured to permit communication between a first participant device comprising a first cryptographic processor and a second participant device comprising a second cryptographic processor, said system comprising said first participant device and said second participant device, wherein:
said second cryptographic processor is configured to, upon initiation of said transaction by said first participant device, send a first message to said first participant device, said first message including information pertaining to said second participant device;
said first cryptographic processor is configured to: verify said information pertaining to said second participant device, and, using an anomalous elliptic curve scheme, generate a first value and a second value, prepare a second message comprising said first value, prepare a digital signature comprising a first signature component encrypting said second message and a second signature component generated using a hash, said hash generated using said second value, and send said digital signature, said hash and information pertaining to said first participant device to said second participant device;
said second cryptographic processor is further configured to verify said information pertaining to said first participant device, decrypt said first signature component to extract said second message from said first signature component using said second signature component and said hash and extract said first value from said second message, and send said first value extracted from said second message to said first participant device to acknowledge provision of said service; and
said first cryptographic processor is further configured to authenticate said second participant by verifying that said first value extracted by said second cryptographic processor and returned to said first participant device is equal to said first value originally generated by said first cryptographic processor and, send said second value to said authenticated second participant device, completing said first transaction, whereupon said authenticated second participant device provides said second value to said third participant to complete said second transaction.

49. The system according to claim 48 wherein any one or more of the following is true: said first participant device is a card which performs cryptographic operations; said second participant device is a terminal; said third participant is a financial institution.

50. The system according to claim 48 wherein said information pertaining to said second participant device included in said first message includes details and credentials of said second participant device.

51. The system according to claim 50 wherein said credentials include a public key certificate.

52. The system according to claim 48 wherein said information pertaining to said first participant device included in said second message includes details and credentials of said first participant device.

53. The system according to claim 48 wherein said second message includes an identifier generated by said second participant device to provide verification of the authenticity of said first participant device.

54. The system according to claim 53 further configured for: said second participant device completing said transaction by providing said service; and said second participant device sending said third participant said first value and second value and said identifier to obtain said payment.

55. The system according to claim 54 further comprising a third participant device, wherein said third participant device comprises a processor configured for: verifying said first value and second value and said identifier; and providing said payment to said second participant device.

56. The system according to claim 53 wherein said identifier is a unique purchase I.D.

* * * * *